(12) United States Patent
Kopp et al.

(10) Patent No.: US 12,098,960 B2
(45) Date of Patent: Sep. 24, 2024

(54) TEMPERATURE SENSOR WITH ANTI-ROTATION STOP

(71) Applicant: SC2N, Creteil (FR)

(72) Inventors: Gabriel Kopp, Cergy Pontoise (FR); Camille Bonneteau, Cergy Pontoise (FR); Jean Sannier, Cergy Pontoise (FR)

(73) Assignee: SC2N, Creteil (FR)

( * ) Notice: Subject to any disclaimer, the term of this patent is extended or adjusted under 35 U.S.C. 154(b) by 635 days.

(21) Appl. No.: 17/291,843

(22) PCT Filed: Nov. 8, 2019

(86) PCT No.: PCT/EP2019/080655
§ 371 (c)(1),
(2) Date: May 6, 2021

(87) PCT Pub. No.: WO2020/094833
PCT Pub. Date: May 14, 2020

(65) Prior Publication Data
US 2022/0011171 A1    Jan. 13, 2022

(30) Foreign Application Priority Data
Nov. 8, 2018 (FR) ...................................... 1860286

(51) Int. Cl.
*G01K 1/14*    (2021.01)
*F02B 77/08*   (2006.01)
(Continued)

(52) U.S. Cl.
CPC .............. *G01K 1/14* (2013.01); *F02B 77/086* (2013.01); *G01K 7/02* (2013.01); *G01K 7/22* (2013.01);
(Continued)

(58) Field of Classification Search
CPC .......... G01K 1/14; G01K 13/024; G01K 7/02; G01K 7/22; G01K 2204/04; F02B 77/086
See application file for complete search history.

(56) References Cited

U.S. PATENT DOCUMENTS 3,913,058 A    10/1975  Nishio et al.
2005/0175066 A1  8/2005  Nakabayashi
2008/0025372 A1  1/2008  Culbertson et al.

FOREIGN PATENT DOCUMENTS

DE  102018112767 A1 * 12/2018 ........... F01N 13/008
FR  2193973 A1  2/1974
(Continued)

OTHER PUBLICATIONS

Translation of DE102018112767A1.*
(Continued)

*Primary Examiner* — Mirellys Jagan
(74) *Attorney, Agent, or Firm* — Osha Bergman Watanabe & Burton LLP

(57) ABSTRACT

A temperature sensor for a motor vehicle is disclosed. The temperature sensor includes a temperature-sensitive element, two electrical wires connecting the temperature-sensitive element to an electrical connector, an insulating sheath surrounding the two electrical wires, a protective endpiece including a closed end in which the temperature-sensitive element is housed, and a fixing means through which the insulating sheath passes. The fixing means has a threaded element to be screwed into a threaded orifice provided in a vehicle engine interface element to fix the temperature sensor to the engine interface element and a stop fixed to the insulating sheath. The stop surrounds the insulating sheath and provides sealing between the inside of the engine interface element and the outside, the threaded element being capable of rotating with respect to the stop. The stop comprises at least one lug that goes into a slot provided in (Continued)

the engine interface element to prevent the temperature sensor from rotating with respect to the engine interface element.

7 Claims, 3 Drawing Sheets

(51) Int. Cl.
    *G01K 7/02*     (2021.01)
    *G01K 7/22*     (2006.01)
    *G01K 13/024*     (2021.01)

(52) U.S. Cl.
    CPC ....... *G01K 13/024* (2021.01); *G01K 2205/04* (2013.01)

(56) References Cited

FOREIGN PATENT DOCUMENTS

| FR | 3035211 | A1 | | 10/2016 | | |
|----|---------|----|----|---------|---|---|
| GB | 2546822 | A | * | 8/2017 | ............. | B60K 13/04 |
| WO | 2012030775 | A1 | | 3/2012 | | |
| WO | WO-2013039014 | A1 | * | 3/2013 | ............... | G01K 1/14 |
| WO | WO-2016185138 | A1 | * | 11/2016 | ............... | G01K 7/22 |

OTHER PUBLICATIONS

English Translation of Office Action issued in counterpart Chinese Patent Application No. CN 201980086966.2 issued Sep. 21, 2023 (5 pages).

International Search Report Issued in Corresponding PCT Application No. PCT/EP2019/080655, dated Feb. 5, 2020. (5 Pages with English Translation).

Written Opinion of the International Research Administration Issued in Corresponding PCT Application No. PCT/EP2019/080655, dated Feb. 5, 2020. (6 Pages).

* cited by examiner

TEMPERATURE SENSOR WITH ANTI-ROTATION STOP

BACKGROUND

The present invention relates to a temperature sensor, particularly for measuring temperatures comprised between −40° C. and 1100° C.

The invention applies in particular to temperature sensors suited to measuring the temperature of the exhaust gases of motor vehicles.

The invention also applies to the temperature sensors used in the on-board fuel (ethanol, methane) heating and reforming devices for fuel-cell vehicles.

These sensors generally comprise a temperature-sensitive element, such as a thermistor or a thermocouple, connected to the outside to an electrical/electronic measurement signal exploitation circuit by electrical wires.

Such a temperature sensor of the prior art comprises, at one end, a hot part exposed to the very high temperature.

This hot part contains
the sensitive element of (PTC/NTC) thermistor type in the case of a resistive sensor
the hot junction of the thermocouple wires in the case of a thermocouple sensor.

Two electrical wires connect the temperature-sensitive element to an electrical connector.

An insulating sheath surrounds the two electrical wires.

The electrical wires are routed along the protective end piece and the insulating sheath in order to be accessible on the outside of these and to supply
an electrical voltage representative of the resistance of the thermistor in the case of a resistive sensor,
or an electrical voltage which is a function of the temperature difference between its two ends, in the case of a thermocouple sensor.

In order to do that, the electrical wires are connected to an electrical connector, itself connected to the electrical/electronic circuit of the vehicle.

The temperature sensor comprises a fixing means through which the insulating sheath passes. The latter may be surrounded by a metal protective wrapper.

The fixing means comprises a threaded element intended to be screwed into a threaded orifice provided in a vehicle engine interface element in order to fix the temperature sensor thereto.

The fixing means also comprises a stop fixed to the insulating sheath.

The stop surrounds the insulating sheath and is intended to provide sealing between the inside of the engine interface element and the outside.

This presents particular difficulties when the temperature sensor has a bent sheath which needs to have a set orientation with respect to the vehicle engine interface element.

In addition, during assembly of this type of bent temperature sensor with the engine interface element, the temperature sensor is not always correctly oriented, and this presents problems with electrical connection given that the connector of the temperature sensor is not in the correct position or is distant from the vehicle connector to which it is to be connected. Also, during assembly and tightening of the sensor on the vehicle, the sensor has a tendency to rotate.

This difficulty in finding the correct orientation of the temperature sensor leads to difficulties with fitting, and to a loss of time.

It is therefore an objective of the invention to alleviate these disadvantages of the prior art by providing a temperature sensor that is simpler to fit, and the rotation of which is prevented once it is fixed to the engine.

SUMMARY

The invention relates to a temperature sensor for a motor vehicle, comprising:
a temperature-sensitive element,
two electrical wires connecting the temperature-sensitive element to an electrical connector,
an insulating sheath surrounding the two electrical wires,
a protective endpiece comprising a closed end in which the temperature-sensitive element is housed, and
a fixing means through which the insulating sheath passes, the fixing means comprising a threaded element intended to be screwed into a threaded orifice provided in a vehicle interface element in order to fix the temperature sensor to the engine interface element and a stop fixed to the insulating sheath. The stop surrounds the insulating sheath and is intended to provide sealing between the inside of the engine interface element and the outside. The threaded element is able to rotate with respect to the stop.

According to the invention, the stop comprises at least one lug intended to be inserted in a slot provided in the engine interface element so as to prevent the temperature sensor from rotating with respect to the engine interface element.

The lug is formed as one with the stop. That allows the two functions, sealing and prevention of rotation, to be achieved with the one single part, unlike in the prior art which uses two parts: one for sealing and one for preventing rotation.

The lug is positioned laterally on the stop so that it projects with respect to the insulating sheath.

The stop comprises a tubular part fixed to the insulating sheath and surrounding same. The tubular part of the stop of the fixing means is inserted into the threaded element of the fixing means. The threaded element of the fixing means therefore surrounds the tubular part of the stop.

The tubular part of the stop is extended by a ring at a lower end. The ring extends radially and perpendicularly with respect to the tubular part and being intended to provide sealing between the threaded orifice of the engine interface element and the outside. The ring comprises an internal surface intended to butt against an internal rim surrounding the threaded orifice of the engine interface element, and an external surface intended to form a stop for the threaded element of the fixing means.

The lug forms a tab extending from the ring of the stop in a direction perpendicular to the tubular part.

The lug may be curved. The lug is curved so as to bring about a change in plane in a single same component obtained by pressing.

According to another embodiment, the stop comprises two lugs.

The two lugs are contiguous, forming an angle with respect to one another.

The invention also provides a temperature sensor that is simpler to fit, reducing the fitting time.

Its rotational movement with respect to the engine interface element is prevented.

When the temperature sensor comprises a bent insulating sheath, the indexed stop allows the temperature sensor to be fitted on the engine interface element at a constant orientation, simplifying fitting.

The stop thus offers functions of sealing, indexing and rotation prevention.

BRIEF DESCRIPTION OF DRAWINGS

The features of the invention will be described in greater detail with reference to the attached drawings in which.

DETAILED DESCRIPTION

Figure 1:
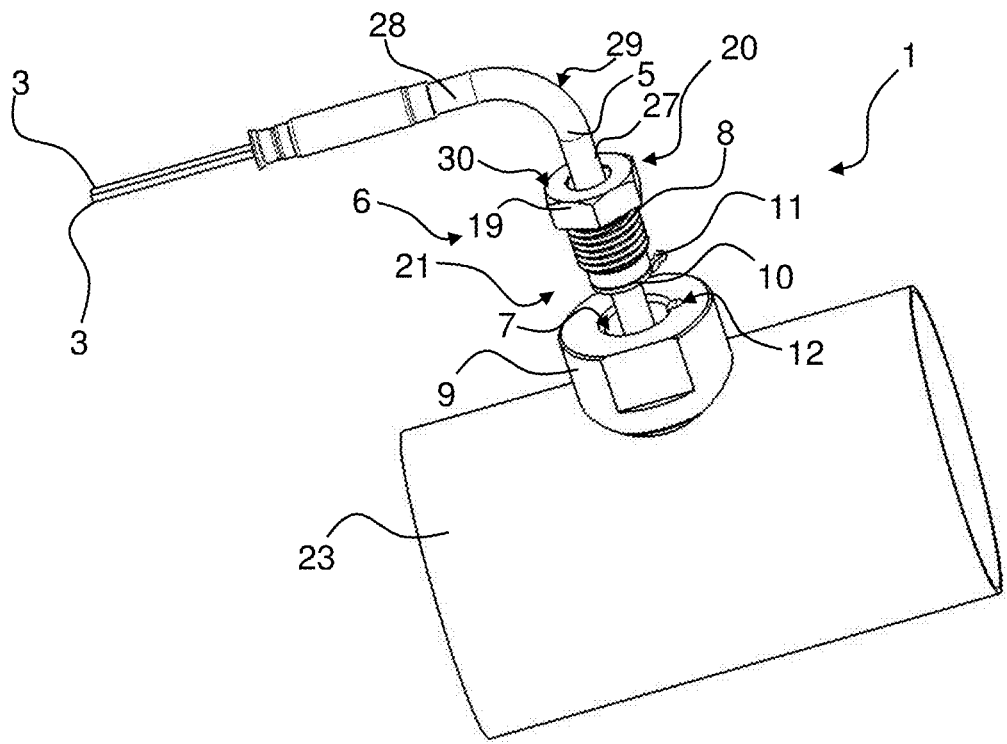
FIG. 1 depicts a perspective view of a temperature sensor before it is fitted on an engine interface element, according to one embodiment of the invention.

FIG. 1 depicts a perspective view of a temperature sensor 1 before it is fitted on an engine interface element 9, according to one embodiment of the invention.

The temperature sensor is intended to measure the temperature of the exhaust gases of motor vehicles. The sensor is also intended to measure temperatures in the on-board fuel (ethanol, methane) heating and reforming devices for fuel-cell vehicles.

The temperature sensor is notably intended to measure so-called average temperatures comprised between −40° C. and 1100° C.

This temperature sensor 1 comprises, at one end, a hot part exposed to the very high temperature.

This hot part contains
the sensitive element of (PTC/NTC) thermistor type in the case of a resistive sensor
the hot junction of the thermocouple wires in the case of a sensor.

The sensor also comprises two electrical wires 3 connecting the temperature-sensitive element or the hot junction to an electrical connector (not depicted), an insulating sheath 5 surrounding the two electrical wires 3, and a protective end piece 4 comprising a closed end 2 in which the temperature-sensitive element or the hot junction is housed.

The electrical connector is connected to an electronic control device of the vehicle (not depicted).

The insulating sheath 5 may be partially or fully surrounded with a protective metal wrapper.

The protective wrapper has a tubular overall shape extending longitudinally.

The protective wrapper is made of a superalloy such as Inconel600®, Inconel625® or Inconel601®.

The temperature sensor 1 comprises a fixing means 6 through which the insulating sheath 5 passes.

The fixing means 6 comprises a threaded element 8 intended to be screwed into a threaded orifice 7 provided in a vehicle engine interface element 9 in order to fix the temperature sensor 1 thereto, and a stop 10 fixed to the insulating sheath 5.

The engine interface element 9 is fitted on a wall 23 of a duct of the vehicle.

The wall 23 delimits an environment, the temperature of which is to be discovered. The wall 23 may be a wall of a duct of a combustion gas exhaust system, for example.

The threaded element 8 comprises a nut 19 at its upper part 20 to allow the threaded element 8 to be screwed into or unscrewed from the threaded orifice 7 of the engine interface element 9 using a tool such as a wrench.

The threaded element 8 comprises a lower surface at its lower end 21 which comes into abutment against the stop 10.

The stop 10 surrounds the insulating sheath 5 and is intended to provide sealing between the inside of the engine interface element 9 and the outside.

The threaded element 8 is able to rotate with respect to the stop 10 in order to allow screwing.

Figure 4:
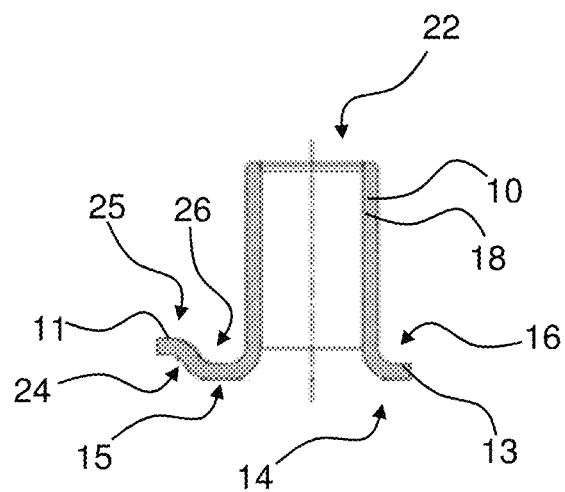
FIG. 4 depicts a longitudinal section through a stop.

The threaded element 8 comprises a central passage through which the insulating sheath 5 can pass. The stop 10 also comprises a central passage 22 through which the insulating sheath 5 can pass, as depicted in FIG. 4.

The fixing means 6 may be made of stainless steel such as 304, 316L or 316Ti.

The temperature-sensitive element may be a thermistor for example. A thermistor is a passive component made of semiconductor material the resistance of which varies as a function of temperature.

The thermistor may be of the Negative Temperature Coefficient (or NTC) type, when the resistance decreases as a function of increasing temperature, or, when the reverse is true, of the Positive Temperature Coefficient (or PTC) type, such as thermistor made of platinum.

As an alternative, the temperature-sensitive element may be a thermocouple hot junction.

According to the invention, the stop 10 comprises at least one lug 11 intended to be inserted in a slot 12 provided in the engine interface element 9 so as to prevent the temperature sensor 1 from rotating with respect to the engine interface element 9, as illustrated in FIGS. 1 to 4.

FIGS. 1 to 4 show an embodiment in which the stop 10 comprises a single lug 11.

The threaded element 8 is not depicted in FIGS. 2 to 6, in order to simplify those figures.

The lug is created as one with the stop. That is to say that the lug and the stop are of one piece. The lug 11 and the stop 10 are in continuity of material, namely made from the same material.

Figure 3:
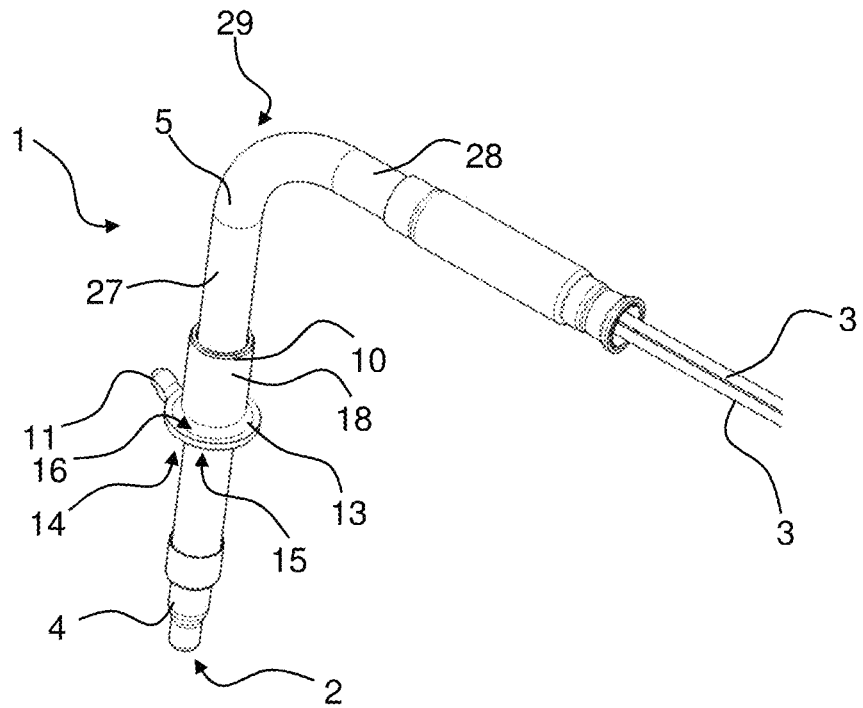
FIG. 3 is a perspective depiction of the temperature sensor alone and without the threaded element.

The lug 11 is positioned laterally on the stop 10 so that it projects with respect to the insulating sheath 5, as illustrated in FIG. 3.

The stop 10 comprises a tubular part 18 of circular cross section fixed to the insulating sheath 5 and surrounding same. The stop 10 is prevented from rotating with respect to the insulating sheath 5.

The threaded element 8 of the fixing means 6 surrounds the tubular part 18 of the stop 10 of the fixing means 6 when the threaded element 8 is screwed into the threaded orifice 7 of the engine interface element 9 and when it is not screwed into same, as illustrated in FIG. 1.

The threaded element 8 is able to rotate with respect to the stop 10.

The tubular part 18 of the stop 10 is extended by a ring 13 at a lower end 14. The tubular part 18 of the stop 10 and the ring are produced as a single piece.

The ring 13 extends radially and substantially perpendicularly with respect to the tubular part 18. And in a plane distinct from the sealing plane. It is intended to provide sealing between the threaded orifice 7 of the engine interface element 9 and the outside of the wall 23 of the engine.

The ring 13 comprises an internal surface 15 intended to butt against or make contact with a rim 17 surrounding the threaded orifice 7 of the engine interface element 9.

The ring 13 comprises an external surface 16 intended to form a stop for the threaded element 8 of the fixing means 6.

In other words, the tubular part 18 of the stop 10 is inserted into the orifice of the threaded element 8 which is retained by the ring 13.

The lower surface located at the lower end 21 of the threaded element 8 comes into abutment against the external surface 16 of the ring 13 of the stop 10.

The lug 11 forms a tab extending from the ring 13 of the stop 10 in a direction perpendicular to the tubular part 18.

The width of the lug 11 is slightly less than that of the slot 12 of the engine interface element 9 so as to allow it to enter same.

The lug 11 is curved. It extends from the ring 13 with a first portion 24 turning up toward the tubular part 18 and extended by a second portion 25 extending perpendicular to the tubular part 18. A hollow 26 is formed between the tubular part 18 and the second portion 25 of the lug 11.

The lower surface located at the lower end 21 of the threaded element 8 is housed in this hollow 26.

The insulating sheath 5 is bent (or curved). It comprises a first portion 27 comprising the temperature-sensitive element and the protective end piece 4, and a second portion 28 connected to the connector.

The second portion 28 is perpendicular to the first portion 27, in this example.

The second portion 28 and the first portion 7 are separated by a bend 29.

The fixing means 6 is positioned between the temperature-sensitive element and the bend 29.

The slot 12 of the engine interface element 9 extends parallel to the first portion 27 and from an external rim 30 of the engine interface element 9 as far as the internal rim 17 of the engine interface element 9.

As the temperature sensor 1 is inserted into the threaded orifice 7 of the engine interface element 9, the lug 11 of the stop becomes inserted into the slot 12 of the engine interface element 9 and slides along this slot as far as the internal rim 17.

The lug 11 has, with respect to the second portion 28 of the temperature sensor 1, an orientation which is predefined.

Figure 2:
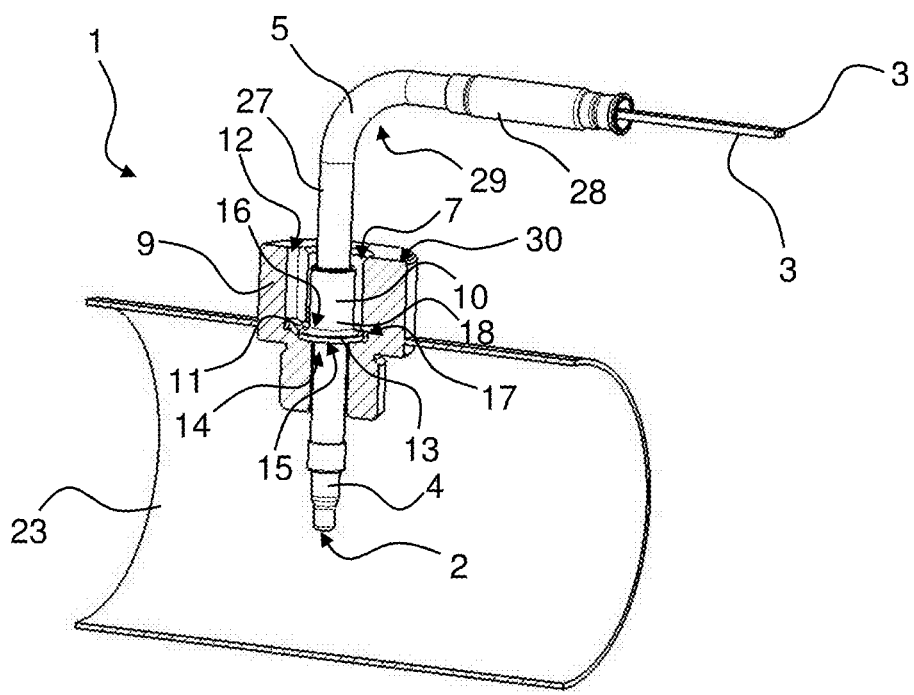
FIG. 2 is a perspective depiction of the temperature sensor fitted on the engine interface element.

In the example of FIG. 2, the directions of the lug 11 and of the second portion 28 of the temperature sensor 1 are substantially parallel and opposite directions.

When the temperature sensor 1 is being fitted on the engine interface element 9, this orientation is always maintained. It is not possible to orient the temperature sensor 1 differently. The operator is therefore unable to make an error during fitting.

In addition, the lug 11 is prevented from rotating in the slot 12 of the engine interface element 9, thus preventing the temperature sensor 1 from rotating when the vehicle is in use.

The threaded element 8 is screwed into the threaded orifice 7 of the engine interface element 9 and tightened therein, causing the stop 10 to be tightened against the internal rim 17 of the engine interface element 9.

The ring 13 of the stop 10 is compressed between the lower end 21 of the threaded element 8 and the internal rim 17 of the engine interface element 9, thus creating sealing between the threaded orifice 7 and the outside of the wall 23 of the engine.

Figure 5:
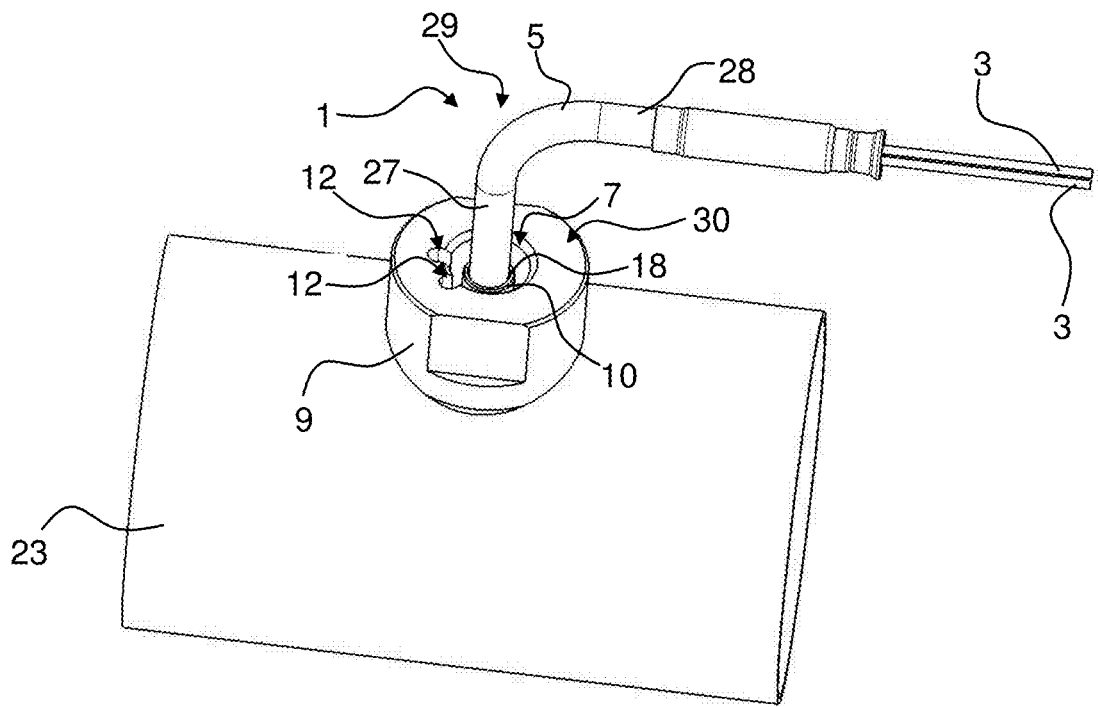
FIG. 5 is a perspective depiction of a temperature sensor according to another embodiment of the invention.
Figure 6:
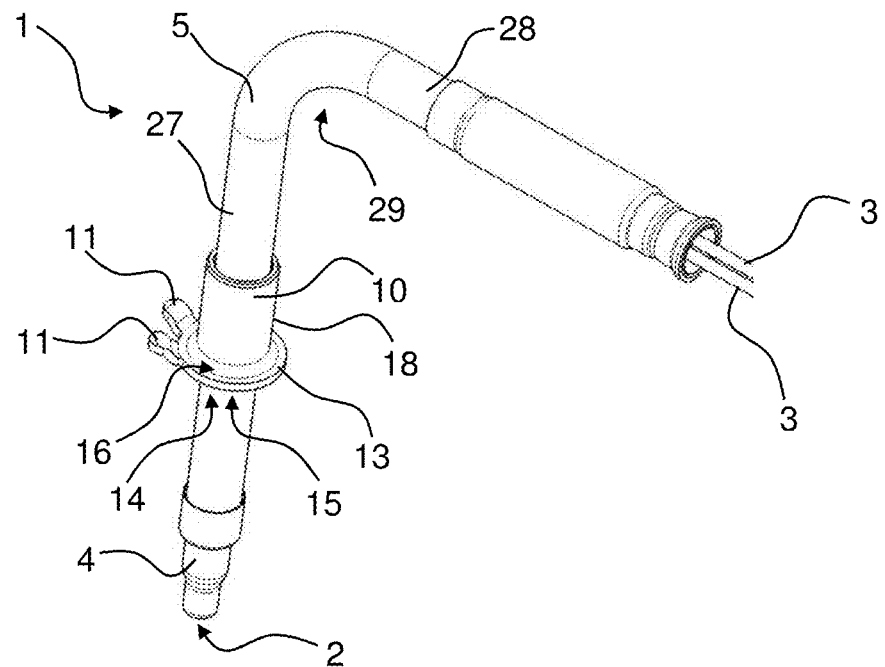
FIG. 6 is a perspective depiction of this temperature sensor alone and without the threaded element.

FIGS. 5 and 6 depict a temperature sensor 1 of which the stop 10 comprises two lugs 11 according to another embodiment of the invention.

The two lugs 11 are contiguous, forming an angle with respect to one another. The two lugs 11 form a "V" and extend out from the ring 13.

At the same time, the engine interface element 9 comprises two contiguous slots 12 forming an angle with respect to one another and in which the two respective lugs 11 of the stop 10 can be inserted.

The angle between the 2 lugs acts as a poka-yoke when several sensors of the same type are assembled in close proximity to one another.

For example:
a first sensor with an angle of 30°
a second with an angle of 60°
a third with an angle of 90°
etc.

It is therefore impossible during fitting to fit the second sensor in the interface for the first, and so on.

Any angle in the interval comprised between 0° and 180° degrees can be defined.

0° corresponding to a single lug
180° corresponding to no poka-yoke

In the range 180° to 360° the range 0° to 180° is repeated, through symmetry.

Considering the angular width (15° to 20°) of the lug, and the spread (5°) on fitting, a range of positions in 30° increments may be considered, thus offering 5 possible positions: 30°, 60°, 90°, 1200 and 150°.

The invention claimed is:

1. A temperature sensor for a motor vehicle, comprising:
   a temperature-sensitive element;
   two electrical wires connecting the temperature-sensitive element to an electrical connector;
   an insulating sheath surrounding the two electrical wires and the temperature-sensitive element; and
   a fixing means through which the insulating sheath passes,
   said fixing means comprising a threaded element configured to be screwed into a threaded orifice provided in an engine interface element of the vehicle in order to fix the temperature sensor to the engine interface element and a stop fixed to the insulating sheath, and
   the stop surrounding the insulating sheath and being configured to provide sealing between an inside of the engine interface element and an outside of the engine interface element, the threaded element being capable of rotating with respect to the stop,
   wherein the stop comprises:
   at least one lug configured to be inserted in a slot provided in the engine interface element so as to prevent the temperature sensor from rotating with respect to the engine interface element; and
   a tubular part fixed to the insulating sheath and surrounding the same, the tubular part of the stop of the fixing means being inserted into the threaded element of the fixing means,
   wherein the tubular part of the stop is extended by a ring at a lower end, the ring extending radially with respect to the tubular part and being configured to provide sealing between the threaded orifice of the engine interface element and the outside of the engine interface element, the ring comprising an internal surface configured to butt against an internal rim surrounding the threaded orifice of the engine interface element, and an external surface configured to form a stop for the threaded element of the fixing means.

2. The temperature sensor as claimed in claim 1, wherein the lug is formed as one with the stop.

3. The temperature sensor as claimed in claim 1, wherein the lug is positioned laterally on the stop so as to project with respect to the insulating sheath.

4. The temperature sensor as claimed in claim 1, wherein the lug forms a tab extending from the ring of the stop in a direction perpendicular to the tubular part.

5. The temperature sensor as claimed in claim 4, wherein the lug is curved.

6. The temperature sensor as claimed in claim 1, wherein the stop comprises two lugs.

7. The temperature sensor as claimed in claim 6, wherein the two lugs are contiguous, forming an angle with respect to one another.

* * * * *